US012054074B2

(12) United States Patent
Ducher (10) Patent No.: US 12,054,074 B2
(45) Date of Patent: Aug. 6, 2024

(54) TRANSPORT REFRIGERATION ANTI-LOCK TIRE SYSTEM AND METHOD

(71) Applicant: Carrier Corporation, Palm Beach Gardens, FL (US)

(72) Inventor: Gael Ducher, Olivet (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 1 day.

(21) Appl. No.: 17/449,115

(22) Filed: Sep. 28, 2021

(65) Prior Publication Data

US 2022/0105808 A1 Apr. 7, 2022

Related U.S. Application Data

(60) Provisional application No. 63/198,225, filed on Oct. 5, 2020.

(51) Int. Cl.
*B60L 7/12* (2006.01)
*B60H 1/00* (2006.01)
*B60H 1/32* (2006.01)
*B60L 1/00* (2006.01)
*B60L 7/14* (2006.01)

(52) U.S. Cl.
CPC ............ *B60L 7/12* (2013.01); *B60H 1/00428* (2013.01); *B60H 1/3232* (2013.01); *B60L 1/003* (2013.01); *B60L 7/14* (2013.01); *B60L 2200/36* (2013.01)

(58) Field of Classification Search
CPC ........ G16B 20/00; G16B 20/20; G16B 20/40; G16B 30/00; B60H 1/00428; B60H 1/3232; B60L 1/003; B60L 2200/36; B60L 7/12; B60L 7/14; B60W 10/24; B60W 10/30;
(Continued)

(56) References Cited

U.S. PATENT DOCUMENTS 8,494,699 B2 7/2013 Bourqui et al.
10,093,187 B2 10/2018 Berels et al.
(Continued)

FOREIGN PATENT DOCUMENTS

WO 2016188775 A1 12/2016
WO WO-2017157502 A1 * 9/2017 .......... B60L 15/2009
(Continued)

*Primary Examiner* — Kawing Chan
(74) *Attorney, Agent, or Firm* — Souad Hakim (57) ABSTRACT

System and method for operating a transport refrigeration system including: a trailer system including a vehicle connected to a transport container; an electric generation device operably coupled to a wheel axle of the trailer system, the electric generation device configured to generate electrical power from the rotational energy of the wheel axle to charge an energy storage device when the electric generation device is activated; an energy management system providing power to the transportation refrigeration unit of the trailer system, the energy management system including an energy controller in communication with at least one of the electric generation device, the energy storage device, an electronic braking unit; an anti-lock braking system including the electronic braking unit in communication with the energy controller, wherein at least one of the electronic braking unit and the energy controller is configured to modify the operation of the electric generation device.

11 Claims, 4 Drawing Sheets

(58) Field of Classification Search
CPC ............... B60W 30/18127; B60T 1/10; B60T 2270/606; B60T 8/1708
USPC .......................................................... 318/89
See application file for complete search history.

(56) References Cited

U.S. PATENT DOCUMENTS

2008/0174174 A1* 7/2008 Burns ..................... B60L 7/14
 303/152
2020/0086849 A1 3/2020 Colavincenzo et al.

FOREIGN PATENT DOCUMENTS

| WO | WO-2018134634 A1 * | 7/2018 | ......... B60H 1/00428 |
| WO | 2020068469 A1 | 4/2020 | |
| WO | 2020072301 A1 | 4/2020 | |
| WO | 2020072706 A1 | 4/2020 | |

* cited by examiner

TRANSPORT REFRIGERATION ANTI-LOCK TIRE SYSTEM AND METHOD

CROSS REFERENCE TO A RELATED APPLICATION

The application claims the benefit of U.S. Provisional Application No. 63/198,225 filed Oct. 5, 2020, the contents of which are hereby incorporated in their entirety.

BACKGROUND

The embodiments herein generally relate to transport refrigeration systems and more specifically, the energy management of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, a prime mover carried on and considered part of the transport refrigeration system, drives an electric generation device, such as an AC synchronous generator that generates AC power. The generated AC power is used to power an electric motor for driving the refrigerant compressor of the transportation refrigeration unit and also powering electric AC fan motors for driving the condenser and evaporator motors, and electric heaters associated with the evaporator. The generated AC power may also be stored in an energy storage device, such as a battery. In some instances, the electric generation device may be operably coupled to a wheel axle of the refrigeration vehicle or the refrigeration trailer. The electric generation device may also be operably coupled to an engine controller which, among other things, may control the operation of the electric generation device. The term "operably coupled" as used throughout means any direct or indirect connection to any other component(s).

It may be desirable under certain vehicle operating conditions, such as during activation of an anti-lock brake system on the vehicle and/or the trailer, to modify the operation of the electric generation device to ensure safe braking operation.

According to one embodiment a transport refrigeration system including: a trailer system comprising a vehicle connected to a transport container; an electric generation device operably coupled to a wheel axle of the trailer system, the electric generation device configured to generate electrical power from the rotational energy of the wheel axle to charge an energy storage device when the electric generation device is activated; an energy management system for providing power to a transportation refrigeration unit of the trailer system, the energy management system including an energy controller in communication with at least one of the electric generation device, the energy storage device, and an electronic braking unit; an anti-lock braking system including the electronic braking unit in communication with the energy controller, wherein at least one of the electronic braking unit and the energy controller is configured to modify the operation of the electric generation device.

In addition to one or more of the features described above, or as an alternative, further embodiments of the transport refrigeration system wherein the electric generation device is directly or indirectly coupled to the wheel axle.

In addition to one or more of the features described above, or as an alternative, further embodiments of the transport refrigeration system wherein a gearbox is operably coupled between the electric generation device and a differential, wherein the differential is operably coupled to the wheel axle and the gearbox.

In addition to one or more of the features described above, or as an alternative, further embodiments of the transport refrigeration system wherein at least one of the electric generation device, the energy controller and the electronic braking unit is communicably coupled to a sensor for detecting at least one of torque and rotational velocity, of the wheel axle.

In addition to one or more of the features described above, or as an alternative, further embodiments of the transport refrigeration system wherein the energy controller is configured to have a predetermined operating limit corresponding to at least one of torque, rotational velocity, and time.

In addition to one or more of the features described above, or as an alternative, further embodiments of the transport refrigeration system wherein at least one of the electronic braking unit and the energy controller is configured to initiate an electric generation device control action when the at least one of a predetermined operating limit is exceeded and an ABS braking event is triggered.

In addition to one or more of the features described above, or as an alternative, further embodiments of the transport refrigeration system wherein a control action comprises at least one of, increasing the torque of the electric generation device, decreasing the torque of the electric generation device, maintaining the current operating condition of the electric generation device.

In addition to one or more of the features described above, or as an alternative, further embodiments of the transport refrigeration system wherein the energy storage device includes at least one of a battery, and a fuel cell.

In addition to one or more of the features described above, or as an alternative, further embodiments of the transport refrigeration system wherein the electric generation device includes at least one of a permanent magnet AC generator, an asynchronous AC generator, a synchronous AC generator, and an engine driven DC generator.

According to one embodiment, a method of operating a transport refrigeration system comprising a trailer system having vehicle connected to a transport container, the method including: operating an electric generation device operably connected to at least one of a wheel of the transport refrigeration system and a wheel axle of the transport refrigeration system for harvesting kinetic energy from the operation of the trailer system, wherein the at least one wheel is operably connected to an electronic braking unit; storing at least one electric generation device predetermined operating limit in an energy controller, the energy controller coupled to the electric generation device and the electronic braking unit; measuring with the energy controller, an operating condition associated with at least one of the electric generation device and the electronic braking unit; comparing with the energy controller, the at least one predetermined operating limit to the at least one measured operating condition; determining whether the at least one measured operating condition exceeds the at least one predetermined operating limit; and performing a control action when the measured operating condition exceeds the at least one predetermined operating limit.

In addition to one or more of the features described above, or as an alternative, further embodiments, the method of operating a transport refrigeration system wherein a predetermined operating limit comprises at least one of time, a time interval, torque and/or rotational velocity associated with at least one of the electric generation device and the electronic braking unit.

In addition to one or more of the features described above, or as an alternative, further embodiments, the method of operating a transport refrigeration system wherein the operating condition comprises at least one of time, a time interval, the torque of the electric generation device, and the rotational velocity associated with at least one of the electric generation device and electronic braking unit.

In addition to one or more of the features described above, or as an alternative, further embodiments, the method of operating a transport refrigeration system wherein the control action comprises at least one of increasing torque of the electric generation device, decreasing the torque of the electric generation device, or maintaining the current operating condition of the electric generation device.

In addition to one or more of the features described above, or as an alternative, further embodiments, the method of operating a transport refrigeration system wherein the electric generation device includes at least one of a permanent magnet AC generator, an asynchronous generator, a synchronous AC generator, and an engine driven DC generator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Refrigerated vehicles and refrigerated trailers used in connection with a transport refrigeration system may be equipped with an electric generation device, such as an AC synchronous generator that generates AC power for use or storage by the transport refrigeration system. In some embodiments, the electric generation device can be at least one of an axle generator and a hub generator operably coupled to a wheel axle, configured to recover rotational energy when the transport refrigeration system is in motion. The electric generation device converts rotational energy to electrical energy, such as, for example, when the axle of the trailer system is rotating due to acceleration, cruising, or braking.

In general, the aim of an anti-lock brake system (ABS) is to prevent the vehicle wheels from locking during braking when the frictional forces between the tire and the road surface are not adequate to transmit the braking force from the tire to the road. An ABS typically uses an electronic braking control unit (EBU), which receives a wheel speed signal from one or more wheel speed sensors associated with one or more wheels of the vehicle and/or trailer (e.g., transport container), and at least one modulator to reduce momentarily, the braking pressure applied to one or more of the vehicle wheels if wheel lock is detected. If a vehicle is travelling on a split friction surface, the friction between the road surface and the wheel may vary from wheel to wheel, and this will affect the tendency of each wheel to lock. For example, the wheels on one side of the vehicle may travel over a patch of ice causing a loss of traction and wheel slippage, and in this case, the wheels on the ice will lock at lower braking pressures than other wheels. An "ABS braking event" refers to any event aboard the vehicle requiring automatic activation of ABS capability such as wheel slippage, i.e., an "ABS braking event", typically occurring on a road surface having a low threshold coefficient of friction.

When an ABS braking event occurs, it can cause the electric generation device to experience sudden changes or fluctuations in torque or rotational velocity, which may result in excessive torque loading or torque spikes. Rapid changes in torsional force may be damaging to electric generation device, including connected components which may include bearings and other connected components such as a gear box. Additionally, when a wheel experiences slippage prior to an ABS braking event, the wheel axle may rotate at an undesirably high speed, which can also damage the electric generation device. Erratic variations in torque and/or rotational velocity that can occur during an ABS braking event may also provide a dampening effect that reduces frequency and amplitude of load variations that act on the electric generation device, including a gear box and other connected components. It is desirable then, to modify the operation of the electric generation device when excessive or erratic changes in torque or rotational velocity occur. A system and method for modifying the operation of the electric generation device is described below, using the EBU in communication with an energy management system 330.

Figure 1:
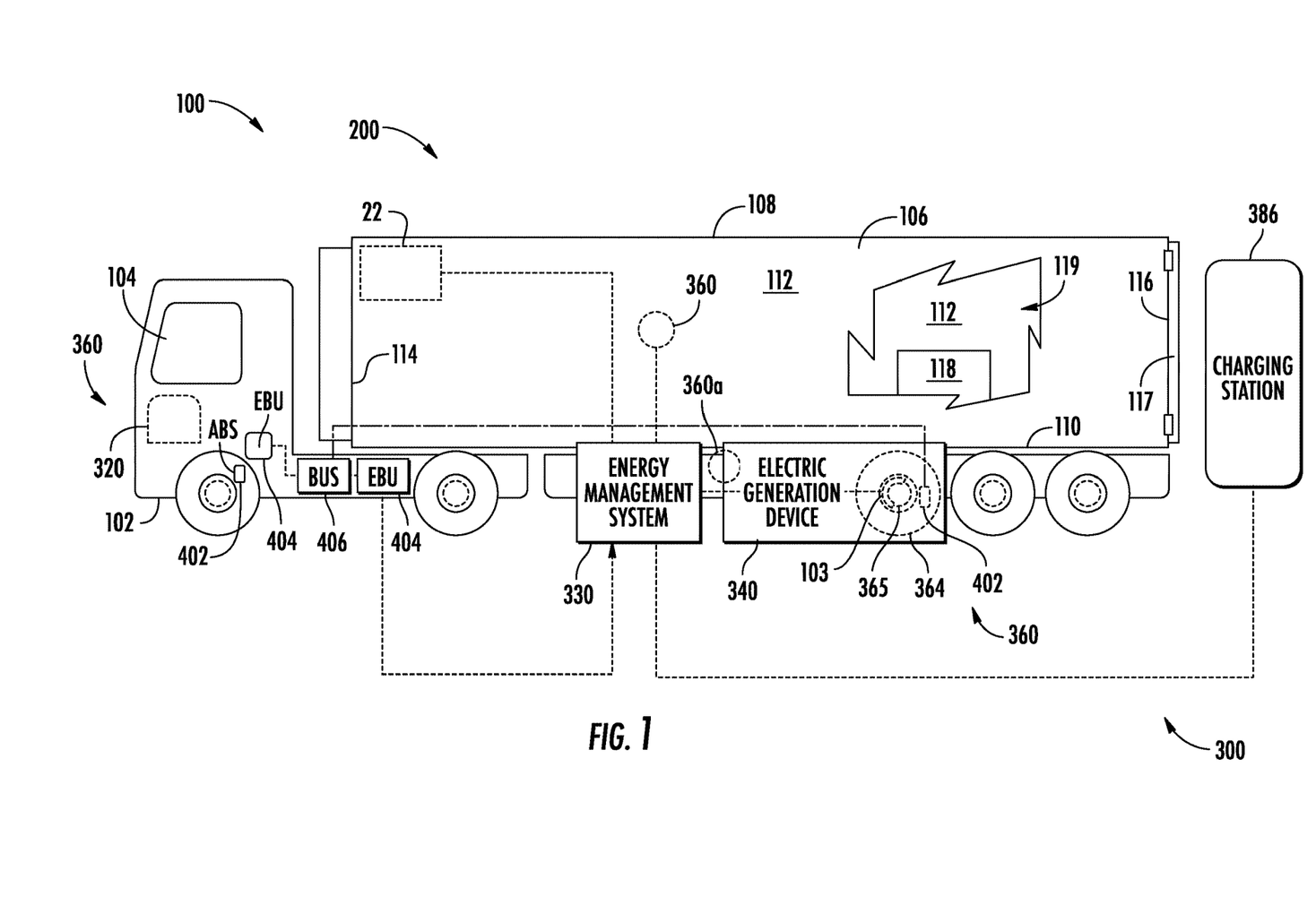
FIG. 1 is a schematic illustration of a transport refrigeration system, according to embodiments of the present disclosure.
Figure 2:
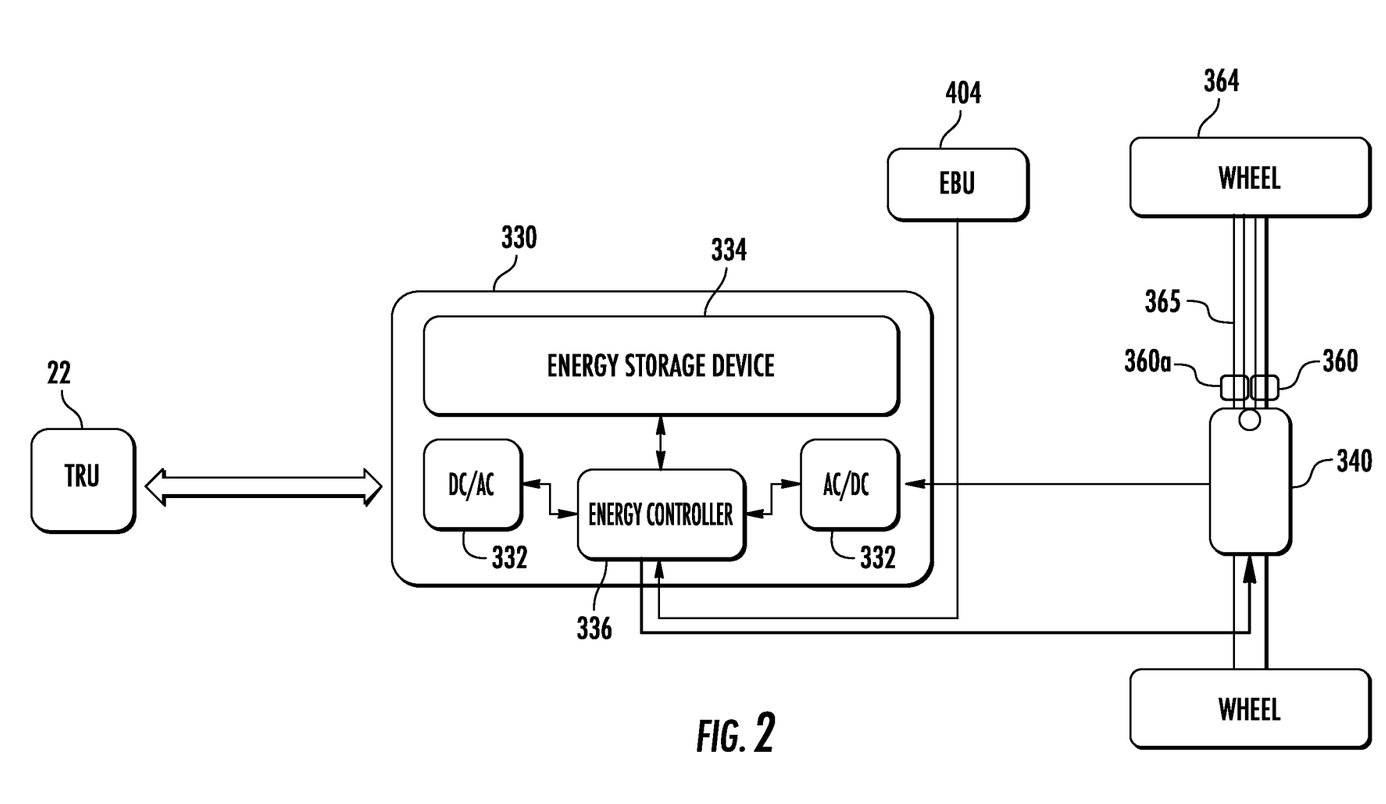
FIG. 2 is an enlarged schematic illustration of a portion of the transport refrigeration system of FIG. 1, according to embodiments of the present disclosure.

Referring to FIG. 1, a schematic illustration of a transport refrigeration system 200, and to FIG. 2, a portion of the transport refrigeration system, each according to embodiments of the present disclosure is shown. The transport refrigeration system 200 is being illustrated as a trailer system 100, as seen in FIG. 1. The trailer system 100 includes a vehicle 102 connected to a transport container 106. In some embodiments, the transport container may be removably coupled to the vehicle 102 as illustrated in FIG. 1, and in other non-limiting embodiments, the vehicle 102 is integrally connected to the transport container 106. The vehicle 102 includes an operator's compartment or cab 104 and a propulsion motor 320 which acts as the drive system of the trailer system 100. The propulsion motor 320 is configured to power the vehicle 102. The energy source that powers the propulsion motor 320 may be at least one of compressed natural gas, liquefied natural gas, gasoline, electricity, diesel, or a combination thereof. The propulsion motor 320 may be an electric motor or a hybrid motor (e.g., a combustion engine and an electric motor). The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transportation refrigeration unit 22, which may include a refrigerant compression device, an electric motor for driving the refrigerant compression device, and a controller. The transportation refrigeration unit 22 is in operative association with the refrigerated cargo space 119 and is configured to provide conditioned air to the transport container 106. The transportation refrigeration unit 22 functions, under the control of the controller, to establish and regulate a desired environmental parameters, such as, for example temperature, pressure, humidity, carbon dioxide, ethylene, ozone, light exposure, vibration exposure, and other conditions in the refrigerated cargo space 119, as known to one of ordinary skill in the art. In an embodiment, the transportation refrigeration unit 22 is capable of providing a desired temperature and humidity range.

The transportation refrigeration unit 22 includes a refrigerant compression device, a refrigerant heat rejection heat exchanger, an expansion device, and a refrigerant heat absorption heat exchanger connected in refrigerant flow communication in a closed loop refrigerant circuit and arranged in a conventional refrigeration cycle. The transportation refrigeration unit 22 also includes one or more fans associated with the refrigerant heat rejection heat exchanger and driven by fan motor(s) and one or more fans associated with the refrigerant heat absorption heat exchanger and driven by fan motor(s). The transportation refrigeration unit 22 may also include a heater associated with the refrigerant heat absorption heat exchanger. In an embodiment, the heater may be an electric resistance heater. It is to be understood that other components (not shown) may be incorporated into the refrigerant circuit as desired, including for example, but not limited to, a suction modulation valve, a receiver, a filter/dryer, an economizer circuit. The transport refrigeration system 200 may also include a controller (not shown) configured to control the operation of the transport refrigeration system 200 including, but not limited to, the operation of various components of the refrigerant unit 22 to provide and maintain a desired thermal environment within the refrigerated cargo space 119.

The trailer system 100 also includes an energy management system 330 and may include at least one of a power converter 332, an energy storage device 334, and an energy controller 336 for controlling the electric generation device 340, each as further described below.

In general, the transportation refrigeration unit 22 has a plurality of electrical power demand loads on the energy storage device 334, such as a drive motor for a fan associated with the refrigerant heat rejection heat exchanger, and a drive motor for a fan associated with the refrigerant heat absorption heat exchanger. As each of the fan motors, and the refrigerant compression device motor, may be an AC motor or a DC motor, it is to be understood that various power converters 332, such as AC to DC rectifiers, DC to AC inverters, AC to AC voltage/frequency converters, and DC to DC voltage converters, may be employed in connection with the energy management system 330. Similarly, power converters 332 also manage power conversion between the electric generation device 340 and the energy storage device 334. Power converters 332 may be located within the energy management system 330 as illustrated in FIG. 2 and/or within the transportation refrigeration unit 22.

Examples of the energy storage device 334 may include a battery system (e.g., a battery or bank of batteries), fuel cells, flow battery, and others devices capable of storing and outputting electric energy that may be DC. The energy storage device 334 may include a battery system, which may employ multiple batteries organized into battery banks, which battery system may be charged by a stationary charging station 386 such as, for example a wall 48V power outlet. The charging station 386 may provide single phase (e.g., level 2 charging capability) or three phase AC power to the energy storage device 334. It is understood that the charging station 386 may have any phase charging and are not limited to single phase or three phase AC power. For example, single phase AC power may be a high voltage DC power, such as, for example, 500 VDC.

The energy controller 336 is operably coupled to at least one of the power converters 332, the energy storage device 334, the electric generation device 340 and the EBU 404. The energy controller 336 may be an electronic controller including a processor and an associated memory comprising computer-executable instructions that, when executed by the processor, cause the processor to perform various operations. The processor of energy controller 336 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The energy controller 336 may be configured to receive, process and communicate signals between: the energy storage device 334 and the transport refrigeration unit 22 in response to load demands, discussed above; power converters 332 in response, for example, to signals received from the electric generation device 340; the electric generation device 340 and the energy storage device 334 relating to the generation and storage of electrical energy; and between the EBU 404 and the electric generation device 340. For example, the energy controller 336 may be configured to perform a control action under certain operating conditions. A control action may include modifying the operation of the electric generation device 340 when the energy controller 336 determines that the electric generation device 340 is operating outside normal operating limits, or when an ABS braking event occurs.

The energy controller 336 may be configured to include at least one electric generation device predetermined operating limit or range, including time, a time interval, torque and/or rotational velocity (each, an "operating limit"). The energy controller 336 may also be configured to control and/or modify the operation of the electric generation device 340 based on signals received from the EBU 404, associated with an ABS braking event, which signals may also be an "operating limit." When an operating limit is exceeded, a control action by the energy controller 336 may include modifying (e.g., increasing or decreasing torque) of the electric generation device 340, as further described below. A control action may also include maintaining the current operating state of the electric generation device, without modifying for example, torque.

The electric generation device 340 is configured to harvest electrical power from kinetic energy of the trailer system 100. The electric generation device 340 can be at least one of an axle generator and a hub generator configured to recover rotational energy when the transport refrigeration system 200 is in motion and converts rotational energy to electrical energy, such as, for example, when the axle 365 of the trailer system 100 is rotating due to acceleration, cruising, or braking.

In one non-limiting embodiment, the electric generation device 340 may be mounted on or operably connected to a wheel axle 365 of the trailer system 100 and the hub generator may be mounted on a wheel 364 of the trailer system 100. It is understood that the electric generation device 340 may be mounted on any wheel 364 or axle 365 of the trailer system 100. The mounting location of the electric generation device 340 illustrated in FIG. 2 is one example of a mounting location. In an alternate embodiment, the electric generation device 340 may be operably connected to the wheel axle 365 or wheel 364 through at least one mechanical linkage, such as, for example a drive shaft, belt system, or gear system (e.g., gear box). The mechanical linkage is configured to rotate the electric generation device 340 as the wheels 364 or wheel axle 365 rotates when the electric generation device 340 is activated.

Figure 3:
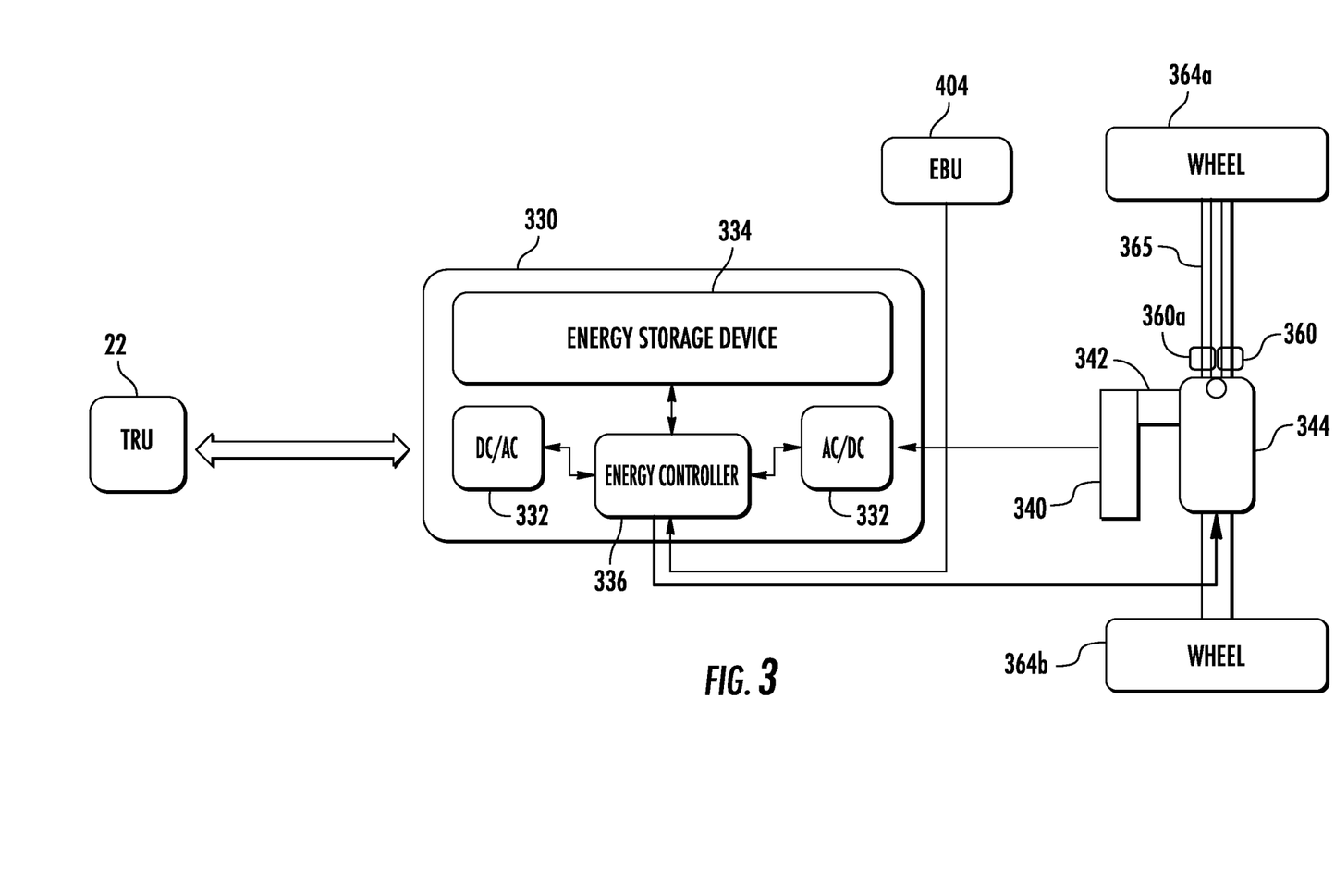
FIG. 3 is an enlarged schematic illustration of a portion of the transport refrigeration system of FIG. 1, according to embodiments of the present disclosure.

In another non-limiting embodiment, the electric generation device 340 may be operably connected to wheel axle 365 via a gearbox 342 and a differential 344 as illustrated in FIG. 3. In general, a differential 344 allows a pair of wheels 364a, 364b to rotate at different speeds to provide proportional revolutions per minute between each wheel. As illustrated in FIG. 3, the differential 344 is operably coupled to wheel axle 365 and to a gear box 342. The gearbox 342 provides speed and torque conversions from the wheel axle 365 to the electric generation 340.

The electric generation device 340 uses the generated electrical power to charge the energy storage device 334. The electric generation device 340 may comprise a single on-board, engine driven AC generator configured to generate alternating current (AC) power including at least one AC voltage at one or more frequencies. In an embodiment, the electric generation device 340 may, for example, be a permanent magnet AC generator, asynchronous generator, or a synchronous AC generator. In another embodiment, the electric generation device 340 may comprise a single on-board, engine driven DC generator configured to generate direct current (DC) power (e.g., at least one voltage).

A torque sensor 360 operably coupled to at least one of the electric generation device 340, the energy controller 336 and the EBU 404. The torque sensor is configured to detect the force of angular rotation of the wheel axle 365. The torque sensor 360 may accomplish this detection utilizing a plurality of connected sensors or a single sensor. The torque sensor 360 may be in wireless communication (e.g., via Wi-Fi, Bluetooth® such as low energy communications (BLE), and radio frequency (e.g., near field communications (NFC)) with at least one of the electric generation device 340, the energy controller 336 and the EBU 404. Similarly, the electric generation device 340 may also include a rotational velocity sensor 360a configured to measure the rotational velocity of the electric generation device 340 (e.g., rotations per minute (RPM)). The torque sensor 360 and/or the rotational velocity sensor 360a may be any type of sensor suitable for the purpose, including rotary, optical or proximity. The rotational velocity sensor 360 is operably coupled to, and may be in wireless communication with, at least one of the electric generation device 340, the energy controller 336 and the EBU 404.

The vehicle 102 and trailer system 100 employ an ABS, which allows independent wheel speeds to be monitored in near real-time using one or more sensors 402 operably coupled to one or more wheels 364. The ABS includes an electronic brake control unit (EBU) 404 in communication with each ABS sensor 402 which activates the ABS when an ABS braking event occurs. The EBU 404 may be located in the vehicle 102 and/or the trailer system 100, and in some embodiments may be operably coupled via a communication bus (CAN Bus) 406. The EBU 404 may be configured to process and communicate signals between one or more ABS sensors and at least one of an EBU 404 and/or a CAN Bus 406; and between at least one EBU and the energy controller 336 to control and/or modify the operation of the electric generation device 340. The EBU 404 may be an electronic controller including a processor and an associated memory comprising computer-executable instructions that, when executed by the processor, cause the processor to perform various operations. The processor of EBU 404 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

Figure 4:
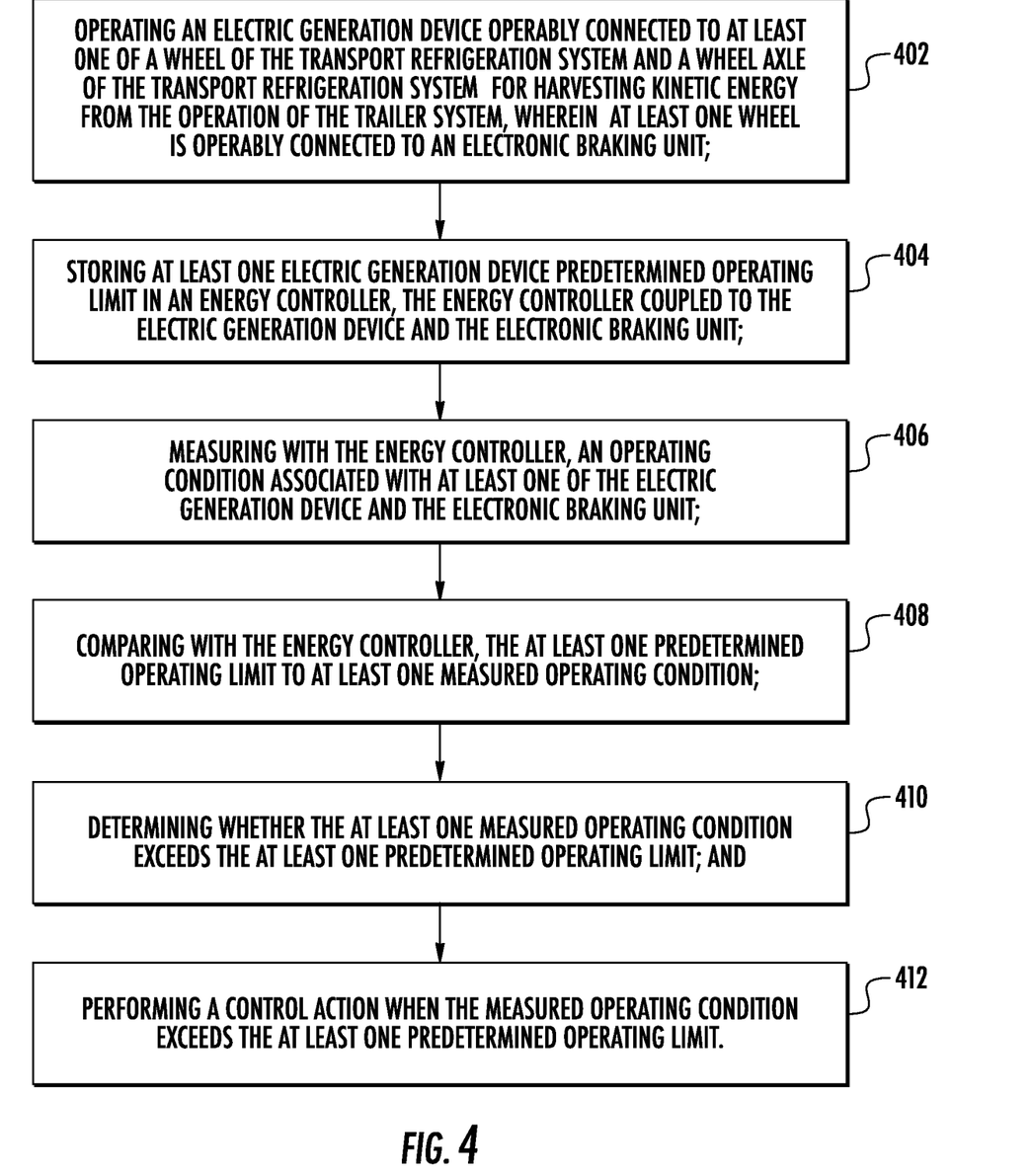
FIG. 4 is a flow process illustrating a method of operating the transport refrigeration system, according to an embodiment of the present disclosure.

Turning to FIG. 4, a method for operating a transport refrigeration system 200 according to embodiments of the present disclosure is shown. The method begins in block 402 with operating an electric generation device 340 operably connected to at least one of a wheel 364 of the transport refrigeration system 200 and a wheel axle 365 of the transport refrigeration system, for harvesting kinetic energy from the operation of the trailer system 100, wherein, the at least one wheel is operably connected to an electronic braking unit (EBU) 404.

In block 404, the method further includes storing at least one electric generation device predetermined operating limit or range ("operating limit") in an energy controller 336, the energy controller operably coupled to the electric generation device 340 and the EBU 404. An operating limit may include time, a time interval, torque and/or rotational velocity, and signals from the EBU associated with an ABS braking event.

In block 406, the method further includes measuring with the energy controller, an operating condition associated with at least one of the electric generation device and the electronic braking unit. Measuring may occur periodically, or over one or more time intervals. An operating condition may include at least one of time, a time interval, torque of the electric generation device 340, and the rotational velocity associated with at least one of the electric generation device and the EBU 404.

In block 408, the method further includes comparing the at least one operating limit to at least one measured operating condition. For example, the method may include comparing in near real-time torque, or to changes in torque over a specified time interval of the electric generation device 340, to a stored operating limit.

In block 410, the method further includes determining whether the at least one measured operating condition exceeds the at least one operating condition. Exceeding an operating condition includes circumstances where an operating condition is over an operating limit and/or under an operating limit. In some embodiments, the energy controller 336 may be configured to measure and compare one operating condition to one operating limit. If the operating condition exceeds the operating limit, the energy controller may determine that a control action is necessary. In another non-limiting embodiment, the energy controller 336 may be measuring more than one operating condition, and then comparing the more than one operating condition to more than one operating limit. For example, one operating condition such as rotational velocity may be over an operating limit, but another operating condition, such as torque of the electric generation device 340 may be under an operating limit. In this example, the energy controller 336 may determine that no control action is necessary.

In block 412, the method further includes performing a control action when the operating condition exceeds the at least one operating limit. For example, if the energy controller 336 determines that an operating condition such as change in torque vs. time exceeds the operating limit for changes in torque vs. time, then the energy controller may perform an action to modify the operation of the electric generation device 340, such as adjusting torque (increasing or decreasing). In another example, a control action may include decreasing torque so as to decouple the electric generation device 340 from the energy storage device 334. Decoupling may occur, for example, when the energy controller 336 determines that electric generation device 340 is operating outside (normal) operating limits.

In some embodiments, decoupling may occur when the energy controller 336 receives a signal from the EBU 404 indicating that an ABS braking event has occurred. For example, an ABS braking event may be triggered based in part, on rotational velocity measured by the EBU 404. In this example, when rotational velocity (or rotational velocity vs. time or a time interval) as measured by the EBU exceeds an EBU predetermined limit or range (e.g., rotational velocity limit or range), the ABS may activate. The EBU 404 may be configured to transmit a signal to the energy controller 336 indicating for example, ABS activation or that an EBU predetermined limit has been exceeded. In either case, the signal associated with ABS activation or that an EBU predetermine limit has been exceed, may also be an "operating limit." In this example, when the energy controller 336 receives a signal from the EBU 404 that an ABS braking event is occurring, the energy controller 336 may electrically disconnect (decouple) the electric generation device 340 (e.g., operating a switch, or reducing torque to a nominal value or zero) to disengage the energy storage device 334 from power, for a period of time (e.g., until the ABS braking event ends) and/or reduce the torque of the electric generation device 340 for a period of time (e.g., until the ABS braking event ends).

In yet another non-limiting example, if at least one operating limit is exceeded for more than a predetermined period of time, a control action may include modifying torque such that the power output of the electric generation device 340 may be lowered to, for example, 10% of maximum power output capacity.

In another non-limiting example, a control action may include increasing torque to normal operating conditions when the energy controller 336 receives a signal from the EBU 404 indicating that an ABS braking event has ended. The control action may include increasing torque over an interval of time depending on the requirements and operating conditions of the trailer system 100.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
    a trailer system connected to a vehicle, and comprising a transport container;
    an electric generation device operably coupled to a wheel axle of the trailer system, the electric generation device configured to generate electrical power from rotational energy of the wheel axle to charge an energy storage device when the electric generation device is activated;
    an energy management system for providing power to a transportation refrigeration unit of the trailer system, the energy management system comprising an energy controller in communication with at least one of the electric generation device, the energy storage device, and an electronic braking unit; and
    an anti-lock braking system (ABS) comprising the electronic braking unit in communication with the energy controller, wherein at least one of the electronic braking unit and the energy controller is configured to modify an operation of the electric generation device by initiating an electric generation device control action when at least one electric generation device predetermined operating limit is exceeded and an ABS braking event is triggered, wherein the electric generation device control action comprises decreasing torque to decouple the electric generation device from the energy storage device.

2. The transport refrigeration system of claim 1, wherein the electric generation device is directly or indirectly coupled to the wheel axle.

3. The transport refrigeration system of claim 2, wherein a gearbox is operably coupled between the electric generation device and a differential, wherein the differential is operably coupled to the wheel axle and the gearbox.

4. The transport refrigeration system of claim 1, wherein at least one of the electric generation device, the energy controller and the electronic braking unit is communicably coupled to a sensor for detecting at least one of torque and rotational velocity, of the wheel axle.

5. The transport refrigeration system of claim 4, wherein the energy controller is configured to store the at least one electric generation device predetermined operating limit corresponding to at least one of torque, rotational velocity, and time.

6. The transport refrigeration system of claim 1, wherein the energy storage device includes at least one of a battery, and a fuel cell.

7. The transport refrigeration system of claim 1, wherein the electric generation device includes at least one of a permanent magnet AC generator, an asynchronous AC generator, a synchronous AC generator, and an engine driven DC generator.

8. A method of operating a transport refrigeration system comprising a trailer system connected to a vehicle and comprising a transport container, the method comprising: operating an electric generation device operably connected to at least one of a wheel and at least one of a wheel axle of the trailer system for harvesting kinetic energy from operation of the trailer system, wherein the at least one wheel is operably connected to an electronic braking unit; storing at least one electric generation device predetermined operating limit in an energy controller, the energy controller coupled to the electric generation device and the electronic braking unit; measuring with the energy controller, an operating condition associated with at least one of the electric generation device and the electronic braking unit; comparing with the energy controller, the at least one electric generation device predetermined operating limit to at least one measured operating condition; determining whether the at least one measured operating condition exceeds the at least one electric generation device predetermined operating limit; wherein at least one of an electronic braking unit and the energy controller is configured to modify an operation of the electric generation device by initiating an electric generation device control action when the at least one electric generation device predetermined operating limit is exceeded and an anti-lock braking system (ABS) braking event is triggered, wherein the electric generation device control action comprises decreasing torque to decouple the electric generation device from the energy storage device.

9. The method of claim 8, wherein the at least one electric generation device predetermined operating limit comprises at least one of time, a time interval, torque and/or rotational velocity associated with at least one of the electric generation device and the electronic braking unit.

10. The method of claim 8, wherein the operating condition comprises at least one of time, a time interval, the torque of the electric generation device, and the rotational velocity associated with at least one of the electric generation device and electronic braking unit.

11. The method of claim 8, wherein the electric generation device includes at least one of a permanent magnet AC generator, an asynchronous generator, a synchronous AC generator, and an engine driven DC generator.

* * * * *